(12) United States Patent
Bruegl

(10) Patent No.: US 11,858,435 B2
(45) Date of Patent: Jan. 2, 2024

(54) ENERGY TRANSMISSION DEVICE FOR WIRELESSLY TRANSMITTING ELECTRIC ENERGY, AND METHOD

(71) Applicant: Bayerische Motoren Werke Aktiengesellschaft, Munich (DE)

(72) Inventor: Juergen Bruegl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 175 days.

(21) Appl. No.: 17/630,991

(22) PCT Filed: Jul. 17, 2020

(86) PCT No.: PCT/EP2020/070346
§ 371 (c)(1),
(2) Date: Jan. 28, 2022

(87) PCT Pub. No.: WO2021/018641
PCT Pub. Date: Feb. 4, 2021

(65) Prior Publication Data
US 2022/0266774 A1    Aug. 25, 2022

(30) Foreign Application Priority Data
Jul. 29, 2019   (DE) ...................... 10 2019 120 428.3

(51) Int. Cl.
*B60R 16/027*   (2006.01)
*H02J 50/05*   (2016.01)
(Continued)

(52) U.S. Cl.
CPC ............ *B60R 16/027* (2013.01); *B60R 16/03* (2013.01); *H02J 50/005* (2020.01); *H02J 50/05* (2016.02)

(58) Field of Classification Search
CPC ........ B60R 16/027; B60R 16/03; H02J 50/05; H02J 50/005
See application file for complete search history.

(56) References Cited

U.S. PATENT DOCUMENTS

2014/0232185 A1* 8/2014 Sempel ................. H02J 50/12
                                                    307/104
2018/0248405 A1   8/2018 Harakawa

FOREIGN PATENT DOCUMENTS

AT             513878 A1    8/2014
DE    10 2007 059 046 B3   4/2009
(Continued)

OTHER PUBLICATIONS

International Search Report (PCT/ISA/210) issued in PCT Application No. PCT/EP2020/070346 dated Oct. 9, 2020 with English translation (five (5) pages).
(Continued)

*Primary Examiner* — Carlos Amaya
(74) *Attorney, Agent, or Firm* — Crowell & Moring LLP

(57) ABSTRACT

An energy transmission device for wirelessly transmitting electric energy includes a first capacitance device which has a first and a second capacitance element and a second capacitance device which has a third and a fourth capacitance element. The electric energy can be transmitted from the first capacitance element to the second capacitance element and from the third capacitance element to the fourth capacitance element by way of a capacitive coupling. The motor vehicle component is designed as a motor vehicle windshield, the first capacitance element and the third capacitance element are designed as a motor vehicle windshield guide of the motor vehicle, and the second capacitance element and the fourth capacitance element are formed on a motor vehicle windshield region of the motor vehicle (Continued)

windshield corresponding to the motor vehicle windshield guide.

10 Claims, 1 Drawing Sheet

(51) Int. Cl.
*H02J 50/00* (2016.01)
*B60R 16/03* (2006.01)

(56) References Cited

FOREIGN PATENT DOCUMENTS

| DE | 10 2016 215 183 A1 | 2/2018 |
|----|---------------------|--------|
| EP | 2 874 275 A1 | 5/2015 |
| EP | 2 745 417 B1 | 6/2019 |
| WO | WO 2013/024432 A2 | 2/2013 |
| WO | WO 2014/091584 A1 | 6/2014 |
| WO | WO 2015/052263 A1 | 4/2015 |

OTHER PUBLICATIONS

German-language Written Opinion (PCT/ISA/237) issued in PCT Application No. PCT/EP2020/070346 dated Oct. 9, 2020 (six (6) pages).

German-language Search Report issued in German Application No. 10 2019 120 428.3 dated May 23, 2020 with partial English translation (11 pages).

* cited by examiner

ENERGY TRANSMISSION DEVICE FOR WIRELESSLY TRANSMITTING ELECTRIC ENERGY, AND METHOD

BACKGROUND AND SUMMARY OF THE INVENTION

The invention relates to an energy transmission apparatus for wirelessly transmitting electrical energy for a functional unit of a motor vehicle part of a motor vehicle. The invention also relates to a method for operating the energy transmission apparatus.

Electrical contact-connection in moving windows in the motor vehicle presents a great challenge. The lines have to be guided over the entire route since on the one hand there is the risk of jamming by the displacement kinematics and on the other hand the line may not oscillate freely in order to prevent noise. It is also problematic that the lines that are moved tend to break after a certain number of cycles. Furthermore, the lines are located in a moisture-prone area. This means that, in addition to moisture and wet, it is also necessary to contend with dust and salt. In this case, there is a significantly higher degree of effort for permanent and reliable contact-connection. Furthermore, the voltages that are to be transmitted are voltages above a safe contact voltage, which are predefined in particular by national guidelines. For components with an operating voltage above these contact voltages, workplace safety requirements are to be met during manufacture as well as in the case of repair. The protection of the end user, even in the event of a collision, must also be ensured. In order to prevent potential dangers, it is therefore advisable to develop fully closed systems.

Furthermore, DE 10 2007 059 046 B3 discloses an apparatus for wireless energy transmission, comprising a primary conductor, and a unit able to move relative to the primary conductor and having a secondary inductance, wherein the primary conductor and the secondary inductance are inductively coupled and at least one electrical consumer is connected to the secondary inductance and supplied with electrical energy from the primary conductor via the secondary inductance, wherein a first data transmission device is connected or coupled to the primary conductor, an electrically conductive coupling surface is formed at the movable unit, the electrically conductive coupling surface together with the primary conductor forms a capacitive coupling element, a second data transmission device which is connected to the conductive coupling surface is provided at the movable unit and data can be transmitted between the first data transmission device and the second data transmission device via the primary conductor.

The object of the present invention is to provide an energy transmission apparatus and a method by way of both of which a simple and yet reliable transmission of electrical energy in moving components can be realized.

This object is achieved by way of the claimed invention.

One aspect of the invention relates to an energy transmission apparatus for wirelessly transmitting electrical energy for a functional unit of a motor vehicle part of a motor vehicle, having a first capacitance device, which has a first capacitance element and a second capacitance element, having a second capacitance device, which has a third capacitance element and a fourth capacitance element, wherein the second capacitance element can be displaced relative to the first capacitance element and the fourth capacitance element can be displaced relative to the third capacitance element, and the electrical energy can be transmitted from the first capacitance element to the second capacitance element and from the third capacitance element to the fourth capacitance element by way of a capacitive coupling.

Provision is made for the motor vehicle component to be designed as a motor vehicle window and for the first capacitance element and the third capacitance element to be designed as a motor vehicle window guide of the motor vehicle and for the second capacitance element and the fourth capacitance element to be formed on a motor vehicle window region of the motor vehicle window corresponding to the motor vehicle window guide.

In particular, this makes it possible to realize simple and yet reliable energy transmission to the functional unit of the motor vehicle part.

In particular, an embodiment of the invention makes use of the fact that, in contrast to the case of inductive energy transmission, where for example the transmission and reception coils must be located directly one above the other, in the case of capacitive power transmission the conductive coupling plates, that is to say the capacitance elements, are directed toward one another. The coupling plates may have almost unrestricted geometric shapes. In particular, it is advantageous if the spacing between the plates, that is to say the capacitance elements, does not change or changes only slightly. In particular, provision is thus made for the spacing between the first capacitance element and the second capacitance element not to change or to change only slightly and for the spacing between the third capacitance element and the fourth capacitance element likewise to change only slightly.

Although the capacitive coupling by way of the capacitance devices is sensitive to changes in the spacing between the coupling plates, that is to say the capacitance elements, it is not sensitive to displacement of these capacitance elements with respect to one another, as long as sufficient coverage is still ensured. This particular feature is used in the form of a transmission antenna being introduced within the motor vehicle window guide on both sides over the entire length thereof. The transmission antenna is, for example, a metallic conductor. This may be flexible conductor tracks or flat ribbon cables, or copper strips, or metal braiding, or may be designed as a simple power line. In particular, it must be taken into consideration here that the electrical conductor must be insulated, the insulation must be designed for the voltage that is to be transmitted, and the electrical conductor must be designed for the current intensity that is to be transmitted. Whether the first capacitance element or the third capacitance element is integrated in the motor vehicle window guide or is formed separately to the motor vehicle window guide is insignificant here.

The reception antennas, in other words the second capacitance element and the fourth capacitance element, are arranged on the movable motor vehicle window. Depending on the electrical function of the motor vehicle window, lamination in the center of the window or suitable adhesive bonding to the outer surface is possible.

Particularly to prevent the dangers around voltages above a safe contact voltage, which are specified in particular by national guidelines, it is possible to connect the first capacitance element and the third capacitance element to the DC/AC converter without a plug connection. The second capacitance element and the fourth capacitance element are also fixedly connected directly to the AC/DC or AC/AC converter or a combination thereof (reverse) converter. The contact-connections may thus be of hermetic or sealed form, which prevents the oxidation of the lines and also makes the system safe from undesired contact. For this purpose, the electronics are expediently adhesively bonded to the motor vehicle window.

A functional unit for switching or for tinting the windowpane may in particular be the functional unit for the motor vehicle part. A heating device for heating the motor vehicle window may also be considered as a functional unit.

Furthermore, the energy transmission apparatus according to an embodiment of the invention additionally makes it possible for data to be able to be transmitted. In particular, the principle of PowerLAN may be used for this purpose, for example.

In accordance with one advantageous embodiment, the second capacitance element is formed on a first side of the motor vehicle window and the fourth capacitance element is formed on a second side of the motor vehicle window opposite the first side. In particular, the motor vehicle then has two motor vehicle window guides, wherein a first motor vehicle window guide is assigned to the first capacitance device, that is to say to the second capacitance element, and the second motor vehicle window guide is assigned to the second capacitance device, that is to say to the fourth capacitance element. Furthermore, in particular, the first capacitance element is then likewise formed on the first side and the third capacitance element is formed on the second side. This makes simple and yet reliable energy transmission possible.

In accordance with a further advantageous embodiment, the second capacitance element and the fourth capacitance element are formed on a first side of the motor vehicle window or the second capacitance element and the fourth capacitance element are formed on a second side of the motor vehicle window opposite the first side. In other words, the first capacitance device and the second capacitance device are each formed together on one side. This makes simple and yet reliable energy transmission possible.

In a further advantageous embodiment, the motor vehicle window guide is designed as a rail element and at least the corresponding motor vehicle window region is guided in the rail element.

Furthermore, provision is made, in particular, for the second capacitance element and/or the fourth capacitance element to be integrated into the motor vehicle window. In particular, they are integrated into the motor vehicle window over the entire length. In particular, the second capacitance element and/or the fourth capacitance element are thus laminated into the motor vehicle window. As an alternative, the second capacitance element may be adhesively bonded to the fourth capacitance element on an outer surface of the motor vehicle window. This makes simple and yet reliable energy transmission possible.

It has also proven to be advantageous if the motor vehicle window guide has a sealing element for sealing the motor vehicle window and the first capacitance element and/or the third capacitance element are arranged between the motor vehicle window guide and the sealing element. This makes it possible for the motor vehicle window to be able to be sealed reliably and nevertheless for the electrical energy transmission to be able to be carried out easily and reliably.

It is also advantageous when the second capacitance element is arranged so as to be able to move relative to the first capacitance element in such a way that these capacitance elements have a common overlap region for transmitting the electrical energy and the fourth capacitance element is arranged so as to be able to move relative to the third capacitance element in such a way that these capacitance elements have a common overlap region for transmitting electrical energy. In other words, it is ensured that the respective capacitance elements have the overlap region for the purpose of transmitting the electrical energy, as a result of which the electrical energy can be transmitted reliably.

In accordance with a further advantageous embodiment, the motor vehicle window is designed as a windowpane or as a sunroof or as a partition window for an interior of the motor vehicle. It is thus possible to realize the energy transmission between a plurality of different motor vehicle windows. As a result, the energy transmission apparatus can be used in the motor vehicle in a highly flexible manner. As an alternative, provision may also be made, for example, for energy transmission to be able to be carried out between a seat element as motor vehicle component.

It is also advantageous when the motor vehicle window guide is designed as a u-shaped motor vehicle window guide. In particular, the motor vehicle window guide is essentially u-shaped. This can ensure that the motor vehicle window is guided reliably in the u-shaped motor vehicle window guide. Furthermore, it is possible to attach the first capacitance element and the fourth capacitance element to the u-shaped motor vehicle window guide in a simple manner.

A further aspect of the invention relates to a method for operating an energy transmission apparatus for wirelessly transmitting electrical energy for a functional unit of a motor vehicle part of a motor vehicle, having a first capacitance device, which has a first capacitance element and a second capacitance element, having a second capacitance device, which has a third capacitance element and a fourth capacitance element, wherein the first capacitance element can be displaced relative to the second capacitance element and the third capacitance element can be displaced relative to the fourth capacitance element, and the electrical energy is transmitted from the first capacitance element to the second capacitance element and from the third capacitance element to the fourth capacitance element by way of a capacitive coupling.

Provision is made for the motor vehicle component to be provided as a motor vehicle window and for the first capacitance element and the third capacitance element to be provided as a motor vehicle window guide of the motor vehicle and for the second capacitance element and the fourth capacitance element to be provided at a motor vehicle window region of the motor vehicle window corresponding to the motor vehicle window guide and for the electrical energy to be transmitted capacitively.

Advantageous embodiments of the energy transmission apparatus are to be considered as advantageous embodiments of the method. The energy transmission apparatus has substantive features that make it possible to carry out the method or an advantageous embodiment thereof.

Another aspect of the invention relates to a motor vehicle part having an energy transmission apparatus in accordance with the preceding aspect. Another aspect of the invention relates to a motor vehicle having a motor vehicle part in accordance with the preceding aspect. The motor vehicle is designed, in particular, as a passenger vehicle.

Further features of the invention may emerge from the claims, the figures and the description of the figures. The features and combinations of features mentioned above in the description and the features and combinations of features mentioned below in the description of the figures and/or shown in the figures alone can be used not only in the respectively stated combination, but also in other combinations or alone.

The invention is now explained in more detail based on a preferred exemplary embodiment and with reference to the drawings.

DETAILED DESCRIPTION OF THE DRAWINGS

Identical or functionally identical elements are provided with the same reference signs in the figures.

Figure 1:
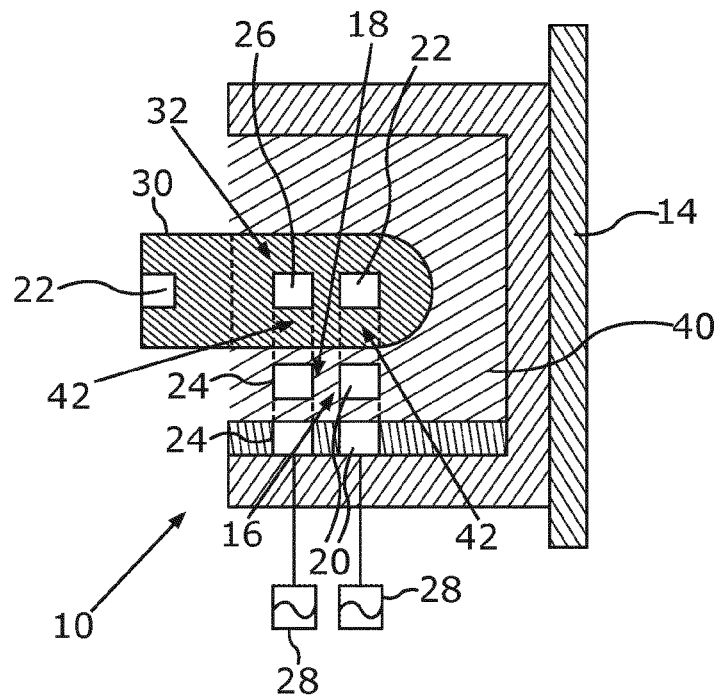
FIG. 1 shows a schematic sectional view of an embodiment of the energy transmission apparatus.

FIG. 1 shows a schematic sectional view of an embodiment of a transmission apparatus 10 for wirelessly transmitting electrical energy for a functional unit 12 of a motor vehicle part of a motor vehicle 14. The energy transmission apparatus 10 has a first capacitance device 16 and a second capacitance device 18. The first capacitance device 16 has a first capacitance element 20 and a second capacitance element 22. The second capacitance device 18 has a third capacitance element 24 and a fourth capacitance element 26. The second capacitance element 22 is able to be displaced relative to the first capacitance element 20 and the fourth capacitance element 26 is able to be displaced relative to the third capacitance element 24. The electrical energy can be transmitted from the first capacitance element 20 to the second capacitance element 22 and from the third capacitance element 24 to the fourth capacitance element 26 by way of a capacitive coupling 28.

Provision is made for the motor vehicle component to be designed as a motor vehicle window 30 and for the first capacitance element 20 and the third capacitance element 26 to be designed as a motor vehicle window guide and for the second capacitance element 22 and the fourth capacitance element 26 to be formed at a motor vehicle window region 32 of the motor vehicle window 30 corresponding to the motor vehicle window guide.

In the present exemplary embodiment, the first capacitance element 20 and the third capacitance element 24 are arranged on a side of the motor vehicle window 30 facing an interior of the motor vehicle 14. FIG. 1 shows two alternative arrangement options for the first and the third capacitance element 20, 24. Firstly, the first and the third capacitance element 20, 24 are arranged separately in an intermediate space between the motor vehicle window guide and a sealing element 40. In the other example, the first and the third capacitance element 20, 24 are formed in the sealing element. Furthermore, FIG. 1 in this exemplary embodiment shows that the first capacitance device 16 is arranged next to the second capacitance device, in particular when viewed in a vehicle longitudinal direction.

FIG. 1 shows in particular that the second capacitance element 22 and the fourth capacitance element 26 are formed on a first side 34 (FIG. 2) of the motor vehicle window 30 or the second capacitance element 22 and the fourth capacitance element 26 are formed on a second side 36 (FIG. 2) of the motor vehicle window 30 opposite the first side 34.

FIG. 1 also shows that the motor vehicle window guide is designed as a rail element 38 and at least the corresponding motor vehicle window region 32 is guided in the rail element 38.

Furthermore, provision is made, in particular, for the second capacitance element 22 and/or the fourth capacitance element 26 to be integrated into the motor vehicle window 30.

Provision may be made, in particular, for the motor vehicle window guide to have the sealing element 40 for sealing the motor vehicle window 30. Provision may also be made for the second capacitance element 22 to be arranged so as to be able to move relative to the first capacitance element 20 in such a way that these capacitance elements have a common overlap region 42 for transmitting the electrical energy and for the fourth capacitance element 26 to be arranged so as to be able to move relative to the third capacitance element 24 in such a way that these capacitance elements have a common overlap region 42 for transmitting the electrical energy.

FIG. 1 also shows, in particular, that the motor vehicle window guide is designed as a u-shaped motor vehicle window guide.

Figure 2:
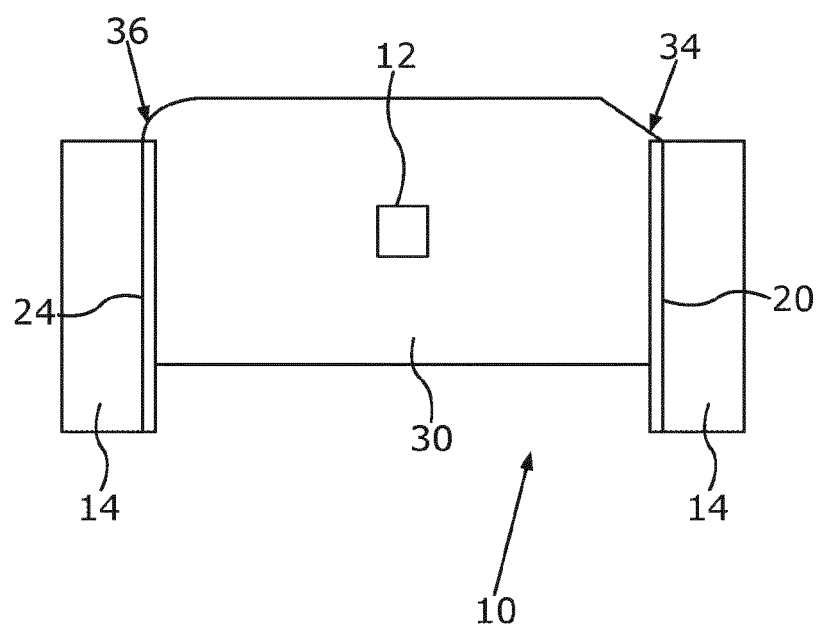
FIG. 2 shows a schematic side view of a further embodiment of the energy transmission apparatus.

FIG. 2 shows a schematic side view of a further embodiment of an energy transmission apparatus 10. In this exemplary embodiment, the motor vehicle window 30 is designed as a windowpane. As an alternative, the motor vehicle window 30 may be designed as a sunroof or as a partition window for an interior of the motor vehicle 14.

In this exemplary embodiment, provision is made, in particular, for the second capacitance element 22 to be formed on the first side 34 of the motor vehicle window 30 and for the fourth capacitance element 26 to be formed on the second side 36. In the following exemplary embodiment, in particular, the first capacitance element 20 and the third capacitance element 24 are shown. The second capacitance element 22 is located visually behind the first capacitance element 20 and the fourth capacitance element 26 is located visually behind the third capacitance element 24.

The figures show, in particular, that, in the method for operating the energy transmission apparatus 10 for wirelessly transmitting electrical energy for the functional unit 12, the electrical energy is transmitted from the first capacitance element 20 to the second capacitance element 22 and from the third capacitance element 24 to the fourth capacitance element 26 by way of the capacitive coupling 28. In this case, provision is made for the motor vehicle component to be provided as a motor vehicle window 30 and for the first capacitance element 20 and the third capacitance element 24 to be provided as a motor vehicle window guide of the motor vehicle 14 and for the second capacitance element 22 and the fourth capacitance element 26 to be provided at a motor vehicle window region 32 of the motor vehicle window 30 corresponding to the motor vehicle window guide and for the electrical energy to be transmitted capacitively.

In particular, an embodiment of the invention makes use of the fact that, in contrast to the case of inductive power transmission, where the transmission and reception coils must be located directly one above the other, in the case of capacitive power transmission the conductive coupling plates, that is to say the capacitance elements 20, 22, 24, 26, are directed toward one another. The capacitance elements 20, 22, 24, 26 may have almost unrestricted geometric shapes. In particular, it is advantageous if the spacing between the capacitance elements 20, 22, 24, 26 does not change or changes only slightly.

The motor vehicle window 30 is held, in particular, in what is known as the window guide, that is to say the motor vehicle window guide, on both sides. This permits vertical displacement of the motor vehicle window 30, for example by 500 millimeters. For the purpose of sealing, what is known as a velvet seal is used as a sealing element 40. This is a u-profile, which is mounted into the window guide. This u-profile in turn surrounds the motor vehicle window 30.

A capacitive coupling is sensitive to changes in the spacing between the capacitance elements 20, 22, 24, 26, but is not sensitive to displacement of these capacitance elements 20, 22, 24, 26 with respect to one another. This particular feature is used in the form of the first capacitance element 20 and the third capacitance element 24 being introduced within the motor vehicle window guide on both sides over the entire length thereof. The first capacitance element 20 and the third capacitance element 24 are a metallic conductor. This may be designed as flexible conductor tracks or flat ribbon cables, or copper strips, or metal braiding, ITO layer, even a simple power line is possible. In particular, the first capacitance element 20 and the third capacitance element 24 possess the property that they are insulated, and wherein the insulation is designed for the voltage that is to be transmitted. The conductor is also designed for the current intensity that is to be transmitted.

In particular, whether the first capacitance element 20 and the third capacitance element 24 are designed as part of the motor vehicle window guide, or as part of the sealing element 40, or between the motor vehicle window guide and the sealing element 40 is insignificant here. Velvet rails ingrained with a metal reinforcement for dimensional stability are known. This metal reinforcement can likewise be used as first capacitance element 20 or as third capacitance element 24.

The second capacitance element 22 or the fourth capacitance element 26, which can also be referred to as reception antennas, are fixedly attached on the movable motor vehicle window 30. Depending on the electrical function of the motor vehicle window 30, lamination in the center of the window, as shown in FIG. 1, or a suitable adhesive bond to the outer surface is possible.

To prevent the dangers around voltages above a safe contact voltage, which are specified in particular by national guidelines, it is possible to connect the first capacitance element 20 and the third capacitance element 24 to a DC/AC converter without a plug connection. The second capacitance element 22 and the fourth capacitance element 26 are also fixedly connected directly to the AC/DC (reverse) converter on the reception side. The contact-connections may thus be of hermetic or sealed form, which prevents oxidation of the lines or of the capacitance elements 20, 22, 24, 26 and also makes the energy transmission apparatus 10 safe from undesired contact. For this purpose, in particular, provision can be made for the reception electronics to be expediently adhesively bonded to the motor vehicle window 30.

Provision may also additionally be made for data to also be able to be transmitted by way of the capacitive coupling. The principle of PowerLAN can be used for this purpose, for example.

Overall, an embodiment of the invention shows wireless power transmission in movable windows.

LIST OF REFERENCE SIGNS

10 Energy transmission apparatus
12 Functional unit
14 Motor vehicle part
16 First capacitance device
18 Second capacitance device
20 First capacitance element
22 Second capacitance element
24 Third capacitance element
26 Fourth capacitance element
28 Capacitive coupling
30 Motor vehicle window
32 Motor vehicle window region
34 First side
36 Second side
38 Rail element
40 Sealing element
42 Overlap region

What is claimed is:

1. An energy transmission apparatus for wirelessly transmitting electrical energy for a functional unit of a motor vehicle part of a motor vehicle, the energy transmission apparatus comprising:
   a first capacitance device comprising a first capacitance element and a second capacitance element, and
   a second capacitance device comprising a third capacitance element and a fourth capacitance element, wherein:
   the second capacitance element is displaceable relative to the first capacitance element,
   the fourth capacitance element is displaceable relative to the third capacitance element,
   the electrical energy is transmittable from the first capacitance element to the second capacitance element and from the third capacitance element to the fourth capacitance element by way of capacitive coupling,
   the motor vehicle component is configured as a motor vehicle window,
   the first capacitance element and the third capacitance element are configured as a motor vehicle window guide of the motor vehicle, and
   the second capacitance element and the fourth capacitance element are formed on a motor vehicle window region of the motor vehicle window corresponding to the motor vehicle window guide.

2. The energy transmission apparatus according to claim 1, wherein:
   the second capacitance element is formed on a first side of the motor vehicle window, and
   the fourth capacitance element is formed on a second side of the motor vehicle window opposite the first side.

3. The energy transmission apparatus according to claim 1, wherein:
   the second capacitance element and the fourth capacitance element are formed on a first side of the motor vehicle window, or
   the second capacitance element and the fourth capacitance element are formed on a second side of the motor vehicle window opposite the first side.

4. The energy transmission apparatus according to claim 1, wherein the motor vehicle window guide is configured as a rail element and at least the corresponding motor vehicle window region is guided in the rail element.

5. The energy transmission apparatus according to claim 1, wherein at least one of the second capacitance element or the fourth capacitance element is integrated into the motor vehicle window.

6. The energy transmission apparatus according to claim 1, wherein:
   the motor vehicle window guide has a sealing element for sealing the motor vehicle window, and
   at least one of the first capacitance element or the third capacitance element is arranged between the motor vehicle window guide and the sealing element.

7. The energy transmission apparatus according to claim 1, wherein:

the second capacitance element is arranged so as to be movable relative to the first capacitance element such that the first capacitance element and the second capacitance element have a first common overlap region for transmitting the electrical energy, and the fourth capacitance element is arranged so as to be movable relative to the third capacitance element such that the third capacitance element and the fourth capacitance element have a second common overlap region for transmitting the electrical energy.

8. The energy transmission apparatus according to claim 1, wherein the motor vehicle window is configured as a windowpane, as a sunroof, or as a partition window for an interior of the motor vehicle.

9. The energy transmission apparatus according to claim 1, wherein the motor vehicle window guide is configured as a u-shaped motor vehicle window guide.

10. A method for operating an energy transmission apparatus for wirelessly transmitting electrical energy for a functional unit of a motor vehicle part of a motor vehicle having a first capacitance device which has a first capacitance element and a second capacitance element, and having a second capacitance device which has a third capacitance element and a fourth capacitance element, wherein the second capacitance element is displaceable relative to the first capacitance element, the fourth capacitance element is displaceable relative to the third capacitance element, and the electrical energy is transmitted from the first capacitance element to the second capacitance element and from the third capacitance element to the fourth capacitance element by way of capacitive coupling, the method comprising:

providing the motor vehicle component as a motor vehicle window;

providing the first capacitance element and the third capacitance element as a motor vehicle window guide of the motor vehicle;

providing the second capacitance element and the fourth capacitance element at a motor vehicle window region of the motor vehicle window corresponding to the motor vehicle window guide; and capacitively transmitting the electrical energy.

* * * * *